(12) United States Patent
Wang et al.

(10) Patent No.: US 12,229,036 B2
(45) Date of Patent: Feb. 18, 2025

(54) AUTOMATICALLY CONTROLLING RESOURCE PARTITIONS IN ADVANCE OF PREDICTED BOTTLENECKS FOR LOG STREAMING MESSAGES

(71) Applicant: International Business Machines Corporation, Armonk, NY (US)

(72) Inventors: Yue Wang, Beijing (CN); Yun Chen, Beijing (CN); Xiao Hai Ma, Beijing (CN); Yuan Hu, Beijing (CN); Ze Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 527 days.

(21) Appl. No.: 17/475,583

(22) Filed: Sep. 15, 2021

(65) Prior Publication Data

US 2023/0083701 A1    Mar. 16, 2023

(51) Int. Cl.
*G06F 11/34* (2006.01)
*G06F 9/50* (2006.01)
*G06F 9/54* (2006.01)
*G06F 11/07* (2006.01)
*G06F 11/30* (2006.01)
(Continued)

(52) U.S. Cl.
CPC ........ *G06F 11/3433* (2013.01); *G06F 9/5055* (2013.01); *G06F 9/542* (2013.01); *G06F 11/0793* (2013.01); *G06F 11/3006* (2013.01); *G06F 11/3428* (2013.01); *G06F 11/3466* (2013.01); *G06F 9/45558* (2013.01); *G06F 2009/4557* (2013.01); *G06F 9/5077* (2013.01); *G06F 9/5083* (2013.01);
(Continued)

(58) Field of Classification Search
CPC .............. G06F 11/3433; G06F 9/5055; G06F 11/0766; G06F 11/0793; G06F 11/3428; G06F 11/004; G06F 9/542; G06F 11/3006; G06F 11/3466; G06F 9/5083; G06F 2209/5019
See application file for complete search history.

(56) References Cited

U.S. PATENT DOCUMENTS

| 6,256,677 B1 * | 7/2001 | Pribnow ................. H04L 47/10 710/262 |
| 2006/0182039 A1 * | 8/2006 | Jourdain ............... H04L 47/115 370/468 |

(Continued)

FOREIGN PATENT DOCUMENTS

| CN | 111913818 A | 11/2020 |
| WO | 2019226652 A1 | 11/2019 |

*Primary Examiner* — Abu Zar Ghaffari
(74) *Attorney, Agent, or Firm* — CANTOR COLBURN LLP; Teddi Maranzano

(57) ABSTRACT

Embodiments of the invention include a computer-implemented method for allocating computing resources. The computer-implemented method includes generating, using a processor, tracing data that results from data traffic processed through multiple data paths by the processor. The processor is used to analyze the tracing data to identify a predicted bottleneck path among the multiple data paths, wherein the predicted bottleneck path include a data path on which a data bottleneck is predicted to occur. The computer resources are allocated to the predicted bottleneck path before the predicted data bottleneck occurs.

20 Claims, 18 Drawing Sheets

(51) Int. Cl.
 *G06F 9/455* (2018.01)
 *G06F 11/00* (2006.01)
(52) U.S. Cl.
 CPC .... *G06F 11/004* (2013.01); *G06F 2209/5017* (2013.01); *G06F 2209/5019* (2013.01); *G06F 2209/508* (2013.01)

(56) References Cited

U.S. PATENT DOCUMENTS

| | | | | |
|---|---|---|---|---|
| 2009/0300173 | A1* | 12/2009 | Bakman | G06F 11/3452 718/1 |
| 2011/0019551 | A1* | 1/2011 | Adams | H04L 47/2491 370/235 |
| 2011/0145800 | A1* | 6/2011 | Rao | G06F 11/3636 717/133 |
| 2013/0297917 | A1* | 11/2013 | Nguyen | G06F 11/3636 712/227 |
| 2015/0365328 | A1* | 12/2015 | Luke | H04L 47/2483 370/235 |
| 2016/0072706 | A1* | 3/2016 | Huang | H04L 47/365 709/223 |
| 2016/0182614 | A1 | 6/2016 | Udupi et al. | |
| 2017/0063965 | A1* | 3/2017 | Grenader | H04L 67/1095 |
| 2017/0347157 | A1* | 11/2017 | Bergstrom | H04L 47/2416 |
| 2018/0203794 | A1* | 7/2018 | Voccio | G06F 8/70 |
| 2018/0329644 | A1* | 11/2018 | Das | G06F 3/0604 |
| 2019/0138367 | A1 | 5/2019 | Bishop et al. | |
| 2019/0339967 | A1* | 11/2019 | Moondhra | G06F 16/2246 |
| 2019/0354914 | A1* | 11/2019 | Nicholas | H04L 63/1425 |
| 2020/0334093 | A1* | 10/2020 | Dubey | G06F 18/23 |
| 2021/0165680 | A1* | 6/2021 | Laschinger | H04L 67/10 |
| 2022/0121628 | A1* | 4/2022 | Devaraj | G06F 11/323 |
| 2023/0106381 | A1* | 4/2023 | Chauhan | G06F 11/3414 714/25 |

* cited by examiner

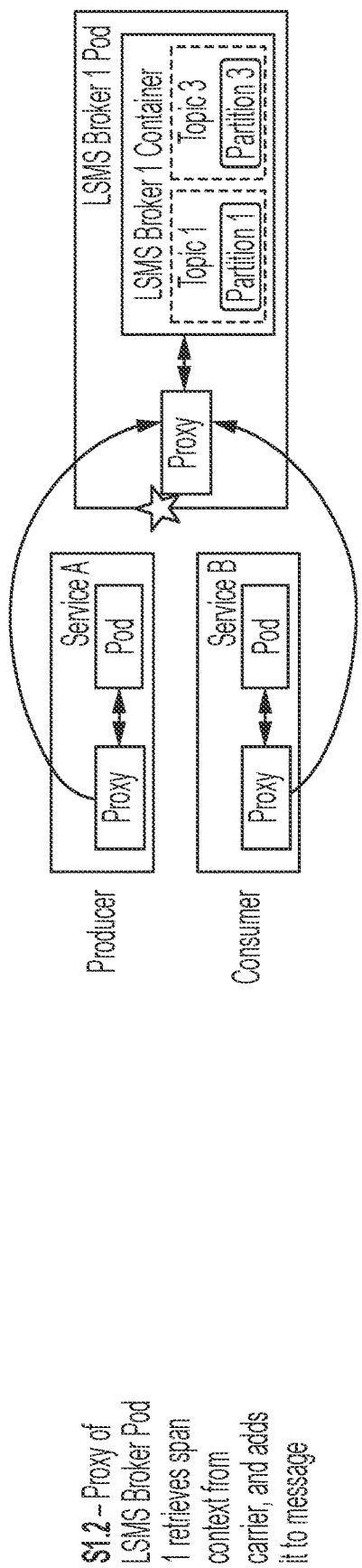
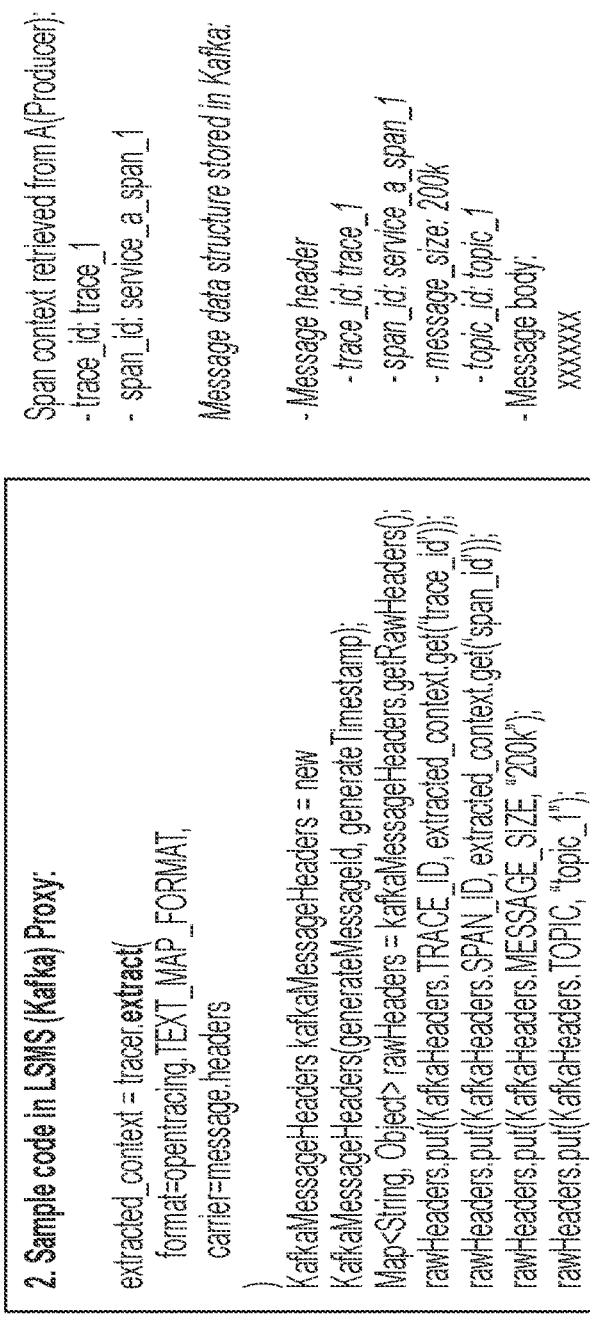
FIG. 8

S3.1 – Message predictor 532 receives service requests, predicts LSMS pressure, and sends scale out request

```
Current Config:
    Topic 3 : 2 partitions * 8G
    Each pod(Broker) includes 2 partitions Predict at T0+30s :
    39.6G-8G*2=23.6G
    23.6G/8G=3
    It needs to add 3 partitions(Topic3) in 10s.

Add 2 pods for Worker Node 560 to extend Topic3 for 3 partitions.
```

AUTOMATICALLY CONTROLLING RESOURCE PARTITIONS IN ADVANCE OF PREDICTED BOTTLENECKS FOR LOG STREAMING MESSAGES

BACKGROUND

The present invention relates generally to programmable computer systems. More specifically, the present invention relates to computer systems, computer-implemented methods, and computer program products that automatically control resource partitions in advance of a predicted bottleneck in a log steaming message system, thereby avoiding the predicted bottleneck.

Microservices are a type of software architecture where the functionality of a software application is broken up into smaller fragments to make the application more resilient and scalable. The smaller fragments are referred to as "services. Each service is modularized in that it focuses only on a single functionality of the application and is isolated from the services, thus making each service substantially independent. Modularity allows development teams to work separately on the different services without requiring complex design-related orchestration between the teams. Although each service has its own assigned function(s), the microservices still need to communicate with one another, and a given microservice can require as an input the output from an upstream microservice. The different microservices can communicate with each other through application programming interfaces (APIs) or web services to execute the overall functionality of the application.

The flexibility and speed of applications that are built as microservices can be improved by deploying the microservices in containers orchestrated using technologies such as an open-source container orchestration framework (OS-COF). An example of a suitable OS-COF is a Kubernetes® open-source platform. Containers enable improved portability for microservices by packaging code, configuration files, libraries, and any dependencies into a lightweight, platform-agnostic executable software bundle.

Microservices often receive inputs and return their outputs using the stream processing functionality of a log streaming messaging system (LSMS). An LSMS, such as Apache Kafka (Apache and Kafka are trademarks of Apache Software Foundation) and Amazon Kinesis (Amazon and Kinesis are trademarks of Amazon.com, Inc.), offers a very lightweight, high-throughput system for data transfer and storage. Features of a typical LSMS include topics in the form of streaming log files written sequentially, which can be partitioned and distributed across a cluster. Each message in a log has a unique identifier called an offset, and messages can be read from any location in the log by specifying the offset to read. Messages can also contain a key. When specified, the message key and payload essentially become a key-value pair. Multiple messages can be written to a topic with the same key, any of which can be read back by jumping to the offset of that message. The latest message can be considered the current value for that key. Messages in topics have a lifespan after which they are deleted. This lifespan is fixed for the whole topic, so a topic represents a rolling window of historical messages. Messages in an LSMS are always available for consumption, and the same message can be consumed by multiple clients.

SUMMARY

Embodiments of the invention include a computer-implemented method for allocating computing resources. The computer-implemented method includes generating, using a processor, tracing data that results from data traffic processed through multiple data paths by the processor. The processor is used to analyze the tracing data to identify a predicted bottleneck path among the multiple data paths, wherein the predicted bottleneck path include a data path on which a data bottleneck is predicted to occur. The computer resources are allocated to the predicted bottleneck path before the predicted data bottleneck occurs.

Embodiments of the invention also provide computer systems and computer program products for having substantially the same features as the computer-implemented method described above.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 8 depicts additional details of a portion of the methodology and system architecture shown in FIGS. 5A, 5B, and 6;

FIG. 13 depicts additional details of how a portion of the methodology shown in FIGS. 5 and 6 can be implemented by determining and sending out a sale out request based on the calculations performed in FIG. 12 in accordance with aspects of the invention;

DETAILED DESCRIPTION

Figure 1:
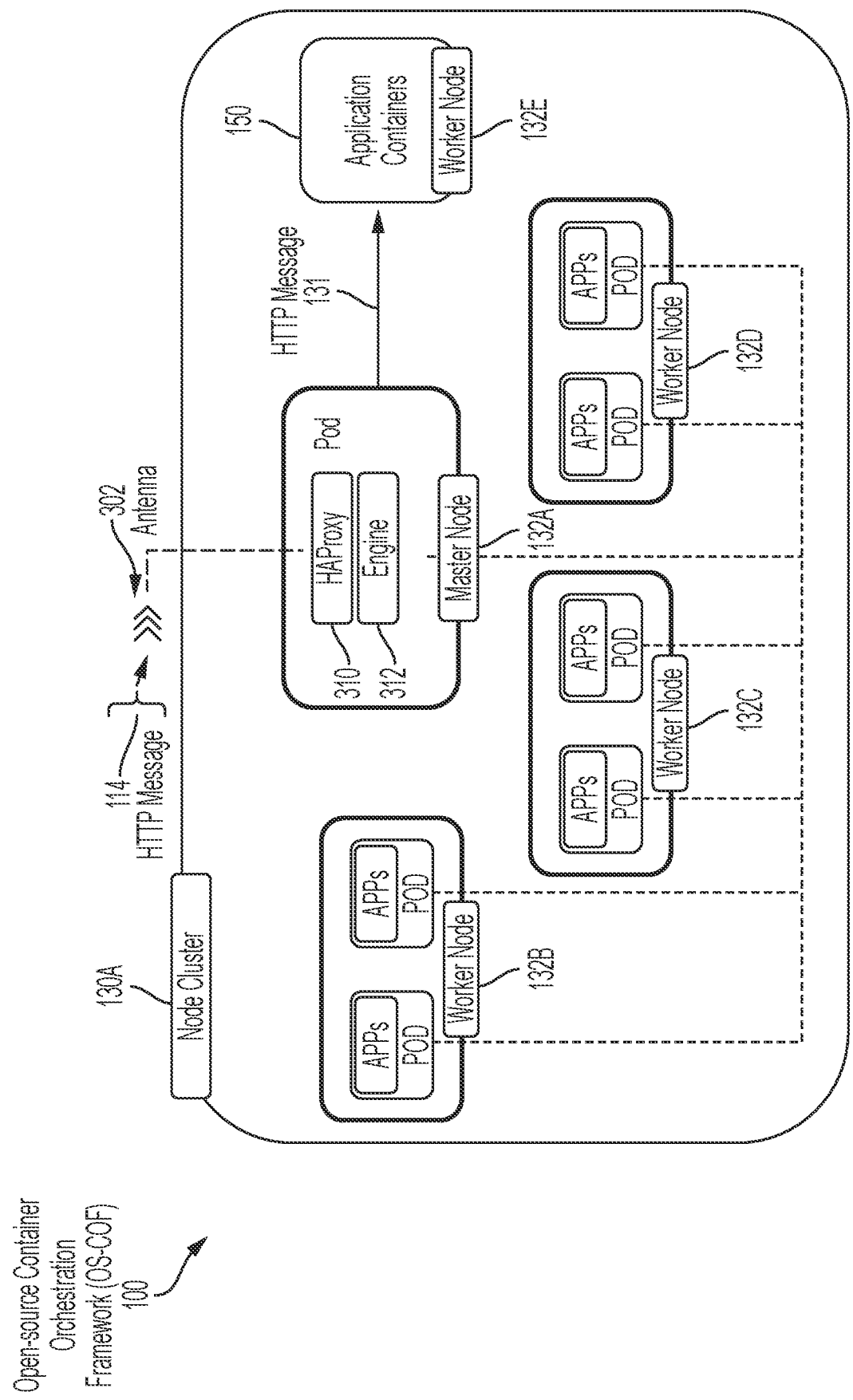
FIG. 1 depicts a diagram illustrating an example of an open-source container orchestration framework (OS-COF) that can be used to implement aspects of the invention.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the function units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

The various components, modules, sub-function, and the like of the systems illustrated herein are depicted separately for ease of illustration and explanation. In embodiments of the invention, the operations performed by the various components, modules, sub-functions, and the like can be distributed differently than shown without departing from the scope of the various embodiments of the invention describe herein unless it is specifically stated otherwise.

For convenience, some of the technical functions and/or operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the informal expression's corresponding more formal and technical description.

Turning now to an overview of technologies that are more specifically related to aspects of the invention, in an LSMS, a stream processor is anything that takes continual streams of data from input topics, performs some processing on this input, and produces continual streams of data to output topics. For example, a retail application might take in input streams of sales and shipments, and output a stream of reorders and price adjustments computed from the input stream data.

As previously noted herein, microservices often receive inputs and return their outputs using the stream processing functionality of a LSMS. Because microservices increase the need for communication, they can place a large request message demand on an LSMS. Autoscaling is a technique used to manage resource allocation of the LSMS when a large number of request messages are placed on the LSMS. With auto scaling, cloud resources (e.g., a designated group of servers) can scale up or down automatically, based on needs. Autoscaling is very similar to load balancing in that both distribute workloads across multiple computing resources (e.g., computers, network links, central processing units (CPUs), and the like) to optimize resource usage, increase throughput and minimize response time. Known autoscaling mechanisms are based on observed metrics, examples of which include CPU and memory usage data tracked by a horizontal pod autoscaler (HPA). However, when a large number of request messages are sent to an LSMS, and the number of request messages sent hits a scaling-out threshold (e.g., a disk-based threshold), known LSMSs need a time window to perform the necessary scale-out operations. This time window creates a bottleneck at the LSMS.

Turning now to an overview of aspects of the invention, embodiments of the invention provide computer systems, computer-implemented methods, and computer program products that avoid the bottleneck issues that occur in known LSMS (e.g., Kafka®) by automatically controlling resource partitions in advance of a predicted bottleneck in an LSMS, thereby avoiding the predicted bottleneck. Embodiments of the invention resolve the limitations of LSMS throughput on cloud platform by using an intelligent computer-implemented method configured to dynamically tune LSMS performance in very large LSMS cluster environments in a cloud platform. In embodiments of the invention, the computer-implemented method includes generating tracing data by a producer and injecting span context into a carrier (e.g., the HTTP header); retrieving span context from the carrier by a proxy of the LSMS and adding it to a message; retrieving span context by a consumer from the message and generating tracing data; enabling a service analyzer to analyze tracing data during analysis time and generating a "service and message dependency tree"; using the "service and message dependency tree" to finding a target node (i.e., the LSMS bottleneck) that needs scaling based on the "service and message dependency tree" and "scale policy"; upon receiving service request by a message predictor during runtime, predicting LSMS pressure (i.e., the bottleneck), determining an appropriate scale out instruction(s), and using a tuning controller to send a corresponding scale out request; and using an LSMS controller to make partition and consumer extensions configured and arranged to avoid the predicted bottleneck.

Figure 2:
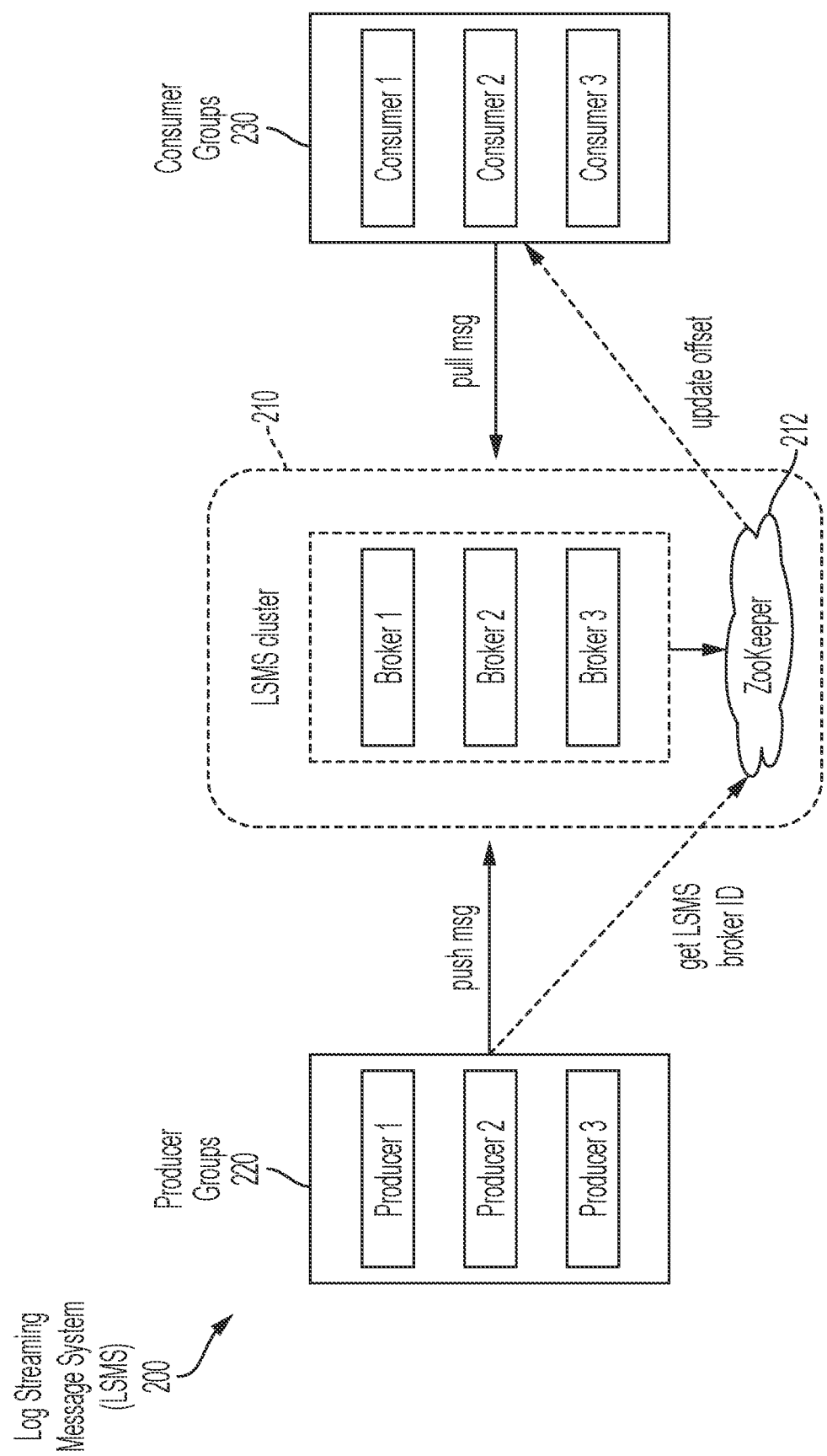
FIG. 2 depicts a diagram illustrating an example of a log streaming message system (LSMS) that can be used to implement aspects of the invention.
Figure 3:
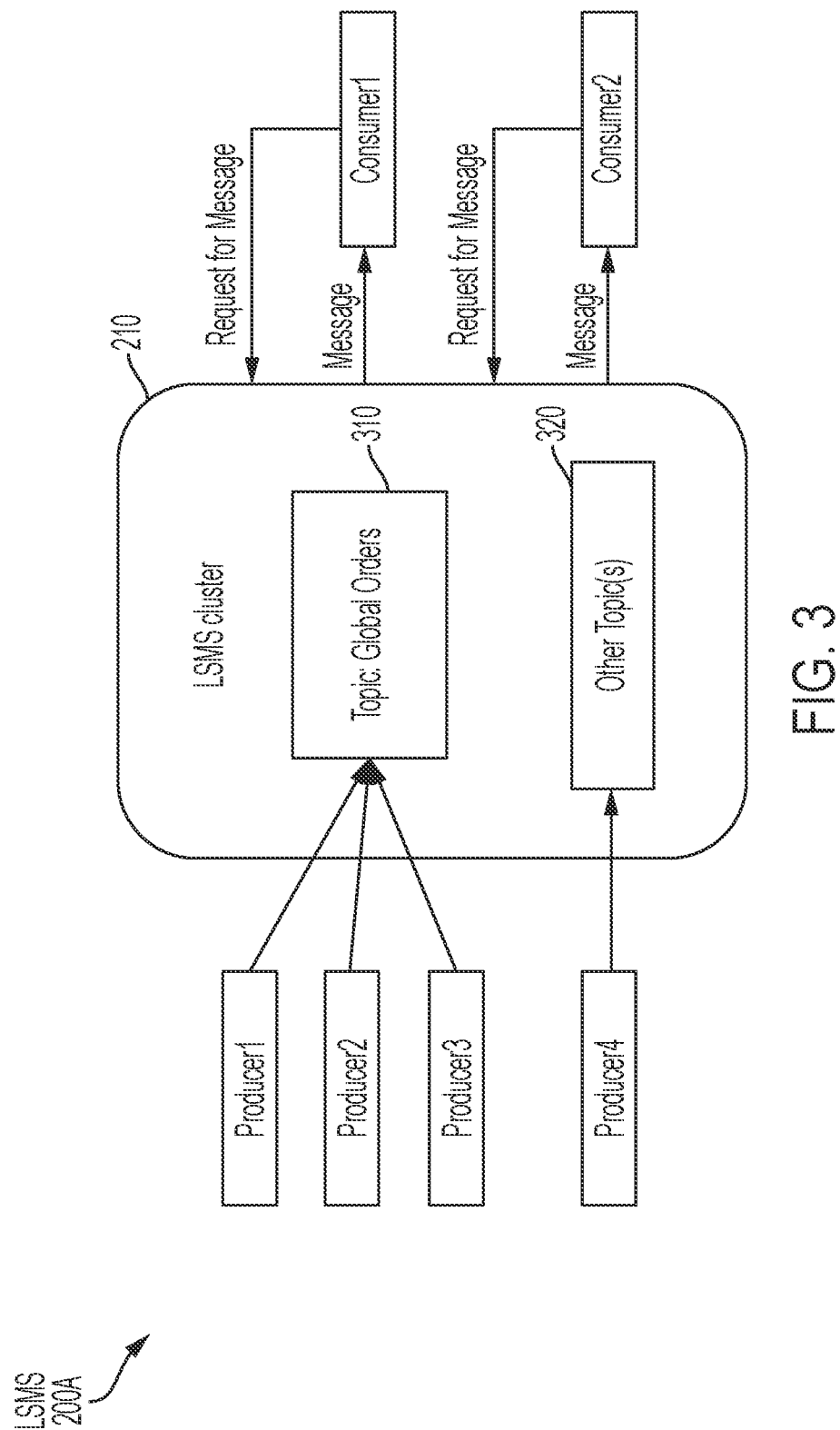
FIG. 3 depicts a diagram illustrating additional details of an LSMS that can be used to implement aspects of the invention.

Turning now to a more detailed description of aspects of the invention, FIGS. 1-3 depicts features of an open-source container orchestration framework (OS-COF) 100 and a log streaming message system (LSMS) 200 that can be utilized to implement aspects of the invention. More specifically, FIG. 1 depicts a diagram illustrating an example of an OS-COF 100 (e.g., Kubernetes®) that can be used to implement aspects of the invention; FIG. 2 depicts a diagram illustrating an example of an LSMS 200 (e.g., Kafka®) that can be used to implement aspects of the invention; and FIG. 3 depicts a diagram illustrating additional details of the LSMS 200 (shown in FIG. 2) that can be used to implement aspects of the invention.

Turning first to FIG. 1, the OS-COF system 100 includes an external entity (not shown) in wireless communication through an antenna 302 with a node cluster 130A. The external entity can be any communications element capable of transmitting over a wireless communication path to the antenna 302 an HTTP message 114 (or an encrypted HTTPS message). The cluster of nodes 130A can contain two types of nodes, namely a master node 132A and one or more worker nodes 132B, 132C, 132D, 132E. The master node 132A is responsible for managing worker nodes 132B, 132C, 132D, 132E in the node cluster 130A. The master node 132A is the entry point for all operations to be executed in the cluster 130A that are received from, for example, an application programming interface, a user interface, or an open-source software (OSS) interface. The worker node 132A is responsible for running one or more workloads and networking with different workloads running on other worker nodes in the cluster 130A. The basic scheduling unit in the worker nodes is a container, such as, for example, a pod. The container can be co-located on the worker node and share resources. Each container in the OS-COF 100 is assigned a unique container internet protocol address within the cluster of worker nodes, which allows applications to use ports without the risk of conflict. A service is a set of containers that work together, such as one tier of a multi-tier application.

In the node cluster 130A includes, the master node 132A includes an application pod that houses a web-server and an engine 312. The web-server of the master node 132A can be implemented as an open-source HAProxy (high availability proxy) server 310. The HAProxy server 310 is configured to receive the HTTP message 114. The worker nodes 132B, 132C, 132D each include application pods and application programs, configured and arranged as shown to perform certain tasks of the node cluster 130A under the control and direction of the engine 312 of the master node 132A. The master node 132A is also communicatively coupled to a set or suite of application containers 150. In accordance with aspects of the invention, the application containers 150 can be implemented as containerized microservices. The flexibility and speed of applications that are built as microservices can be improved by deploying the microservices in containers orchestrated using the OS-COF 100. Containers enable improved portability for microservices by packaging code, configuration files, libraries, and any dependencies into a lightweight, platform-agnostic executable software bundle. The containerized microservices implemented in the application containers 150 can communicate with each other using an LSMS such as the LSMS 200 shown in FIG. 2 and/or LSMS 200A shown in FIG. 3.

FIG. 2 depicts a diagram illustrating an example of an LSMS 200 (e.g., Kafka®) that can be used to implement aspects of the invention. As shown in FIG. 2, the LSMS 200 includes an LSMS cluster 210 communicatively coupled to a producer group 220 and a consumer group 230. The LSMS cluster 210 includes Broker1, Broker2, Broker2, and a Zookeeper synchronization service 212. The producer groups 220 include Producer1, Producer2, and Producer3, and the consumer group 230 includes Consumer1, Consumer2, and Consumer3. The LSMS 200 Kafka is designed for distributed high throughput systems. In general, the LSMS 200 is responsible for transferring data from one application (e.g., Producer1) to another (e.g., Consumer1) so the applications can focus on data but not worry about how to share it. Distributed messaging is based on the concept of reliable message queuing. Messages are queued asynchronously between client applications and messaging system. LSMS 200 tends to work very well as a replacement for a more traditional message broker. In comparison to other messaging systems, LSMS 200 has better throughput, built-in partitioning, replication and inherent fault-tolerance, which makes it a good fit for large-scale message processing applications.

Each of the producers (Producer1, Producer2, Producer3) publishes messages to one or more LSMS topics (e.g., topics 310, 320 shown in FIG. 3). Producers send data to LSMS cluster 210 having a configuration of LSMS brokers (e.g., Broker1, Broker2, Broker3). An LSMS cluster 210 are used to manage the persistence and replication of message data. Every time a producer publishes a message to a broker, the broker simply appends the message to the last segment file. More specifically, the message can be appended to a partition. A producer can also send messages to a partition of its choice. The LSMS brokers are simple systems responsible for maintaining the published data. Each broker can have zero or more partitions per topic. The Zookeeper synchronization service 212 is used for managing and coordinating the brokers in the LSMS cluster 210. The Zookeeper service 212 is mainly used to notify producers and consumers about the presence of any new broker in the LSMS 200 or failure of a broker in the LSMS 200. As per the notification received by the Zookeeper service 212 regarding presence or failure of a broker then the producer and the consumer takes decision and starts coordinating their task with some other broker. Consumers (e.g., Consumer1, Consumer2, Consumer3) read data from brokers. Consumers subscribes to one or more topics and consume published messages by pulling data from the brokers. Because the LSMS brokers are stateless, the consumer has to maintain how many messages have been consumed by using partition offsets. Each partitioned message has a unique sequence id called as offset. If the consumer acknowledges a particular message offset, it implies that the consumer has consumed all prior messages. The consumer issues an asynchronous pull request to the broker to have a buffer of bytes ready to consume. The consumers can rewind or skip to any point in a partition simply by supplying an offset value. The consumer offset values are notified by the Zookeeper service 212.

FIG. 3 depicts a diagram illustrating additional details about topics 310, 320 of an LSMS 200A, which corresponds to the LSMS 200 (shown in FIG. 2). Each topic 310, 320 represents a particular category of messages, and each message transmitted to a broker in the LSMS cluster 210 belongs to and is stored in a particular topic. Topics are split into partitions. For each topic, the LSMS 200 keeps a minimum of one partition. Each such partition contains messages in an immutable ordered sequence. A partition is implemented as a set of segment files of equal sizes.

Figure 4:
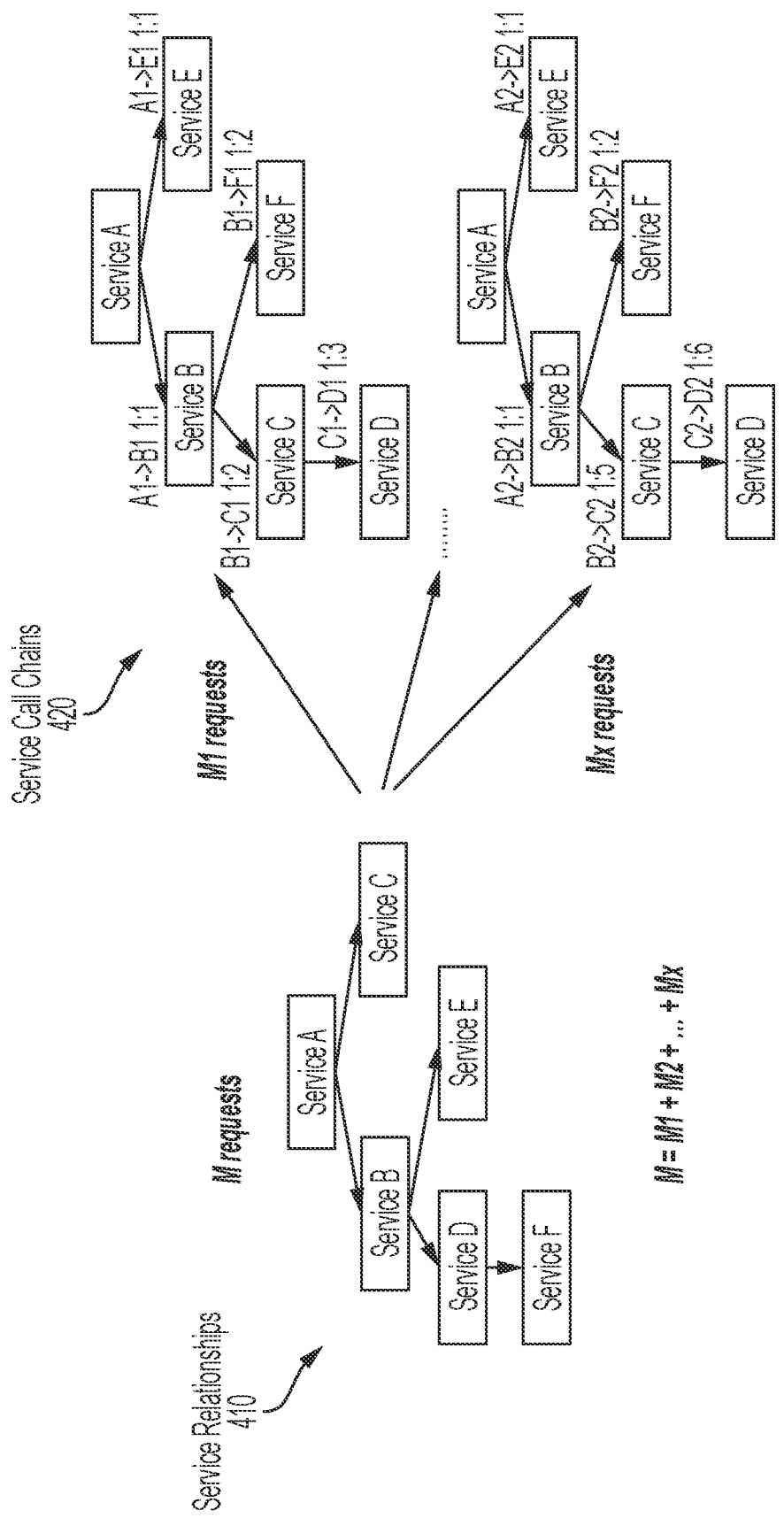
FIG. 4 depicts diagrams illustrating various service relationships disassembled into call chain relationships in accordance with aspects of the invention.

FIG. 4 depicts diagrams illustrating various service relationships 410 disassembled into the relationships between and among several service call chains 420 in accordance with aspects of the invention. The service relationships 400 show three (3) paths. In the first path, Service A invokes Service B, Service B invokes Service C, and Service C invokes Service D. In the second path, Service A invokes Service B and Service B invokes Service F. In the third path, Service A invokes Service E. The service relationships 410 have been disassembled into various service call chains 420. In the topmost example of the service call chains 420, A1 is the API (application program interface) for Service A, B1 is the API for Service B; C1 is the API for Service C; D1 is the API for Service D; E1 is the API for Service E; and F1 is the API for Service F. The service call chains 420 also show the proportions between the relevant services. As shown in FIG. 4, each instance of A1 invokes one instance of B1 and one instance of E1; each instance of B1 invokes two instances of C1 and two instances of F1; and each instance of C1 invokes three instances of D1. In the bottommost example of the service call chains 420, A2 is the API for Service A, B2 is the API for Service B; C2 is the API for Service C; D2 is the API for Service D; E2 is the API for Service E; and F2 is the API for Service F. As shown in FIG. 4, each instance of A2 invokes one instance of B2 and one instance of E2; each instance of B2 invokes five instances of C2 and two instances of F2; and each instance of C2 invokes six instances of D2. The service relationships 410 and service call chains 420 will be used to develop the service and message dependency trees 1002, 1102 shown in FIGS. 10 and 11. The service relationships 410 and service call chains 420 are examples and other service relationships having other service call chain proportions can be utilized without departing from the scope of embodiments of the invention.

Figure 5A:
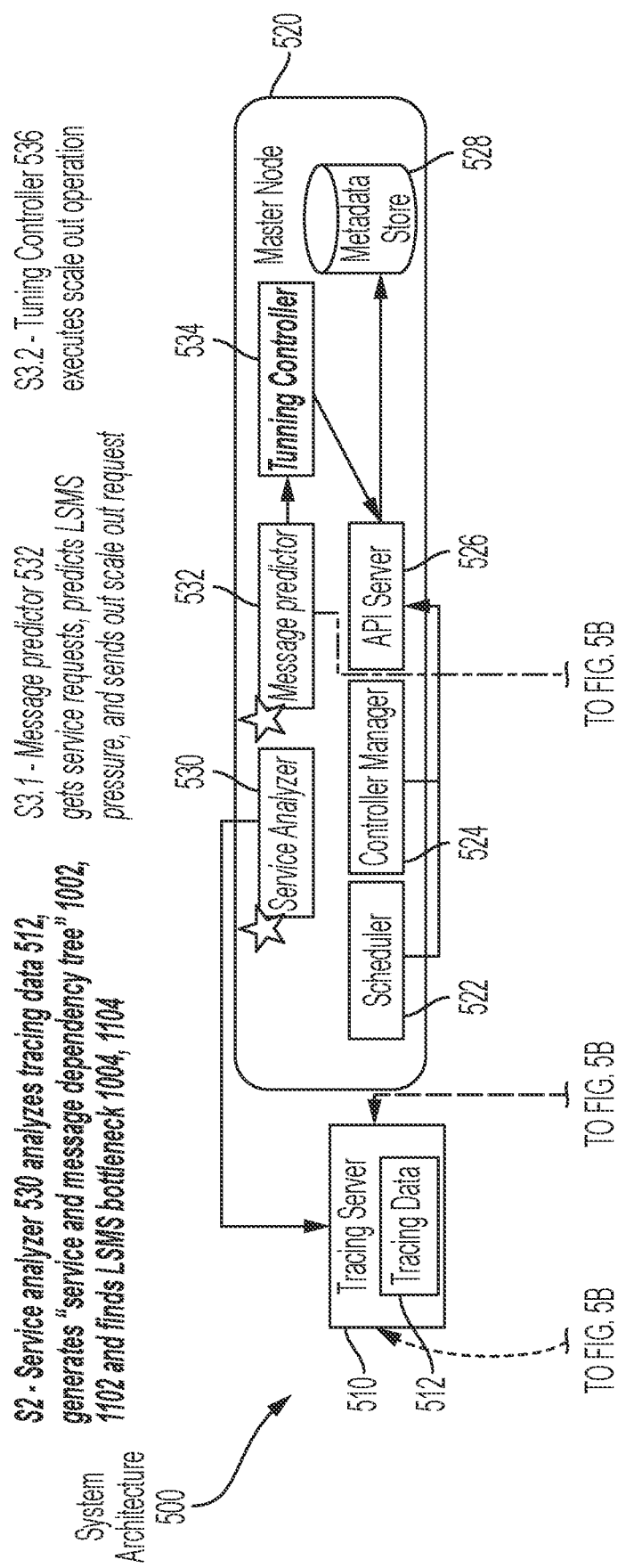
FIG. 5 is depicted in two parts as FIG. 5A and FIG. 5B, wherein in FIG. 5 depicts a diagram illustrating a system architecture and a methodology embodying aspects of the invention.
Figure 5B:
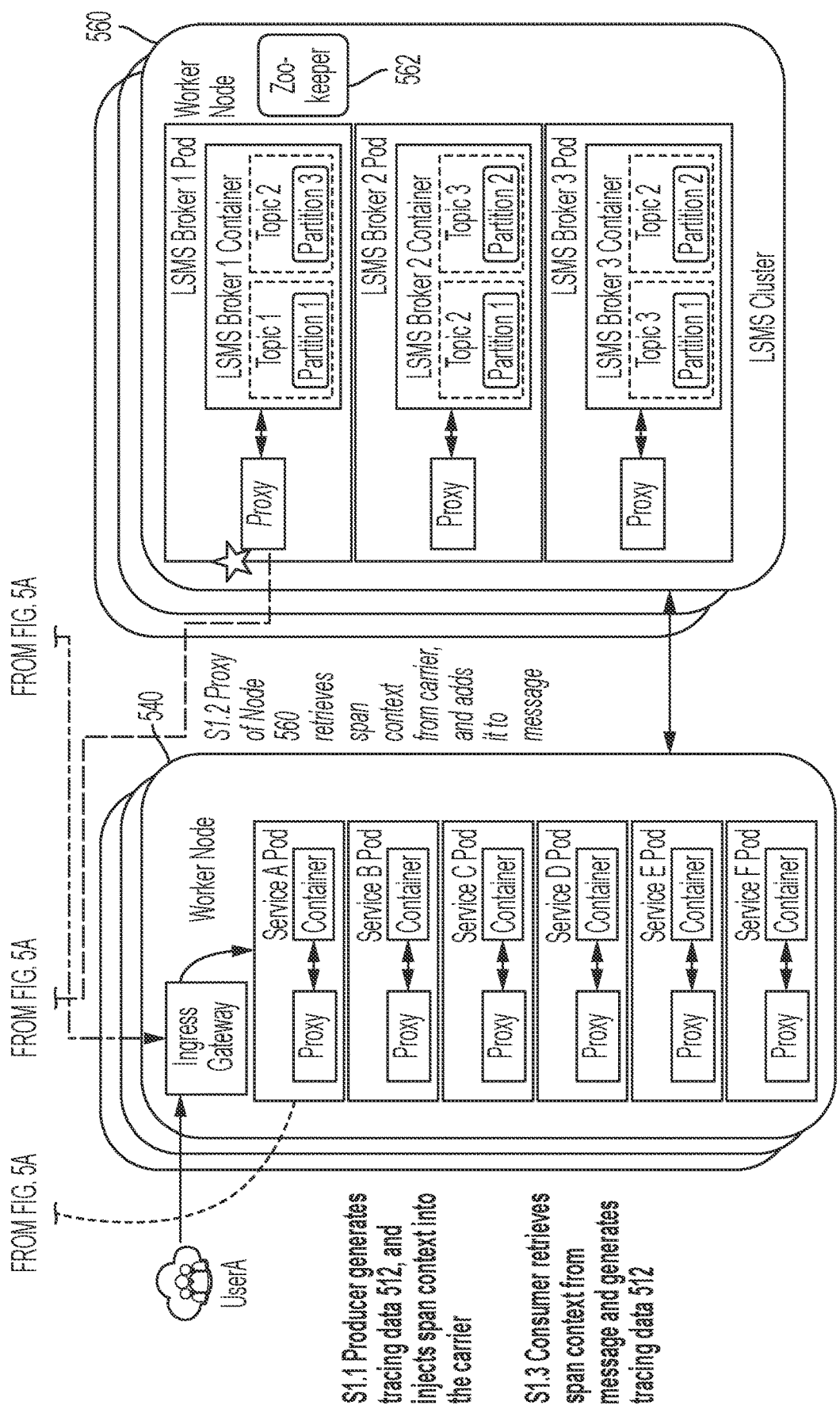
Figure 6:
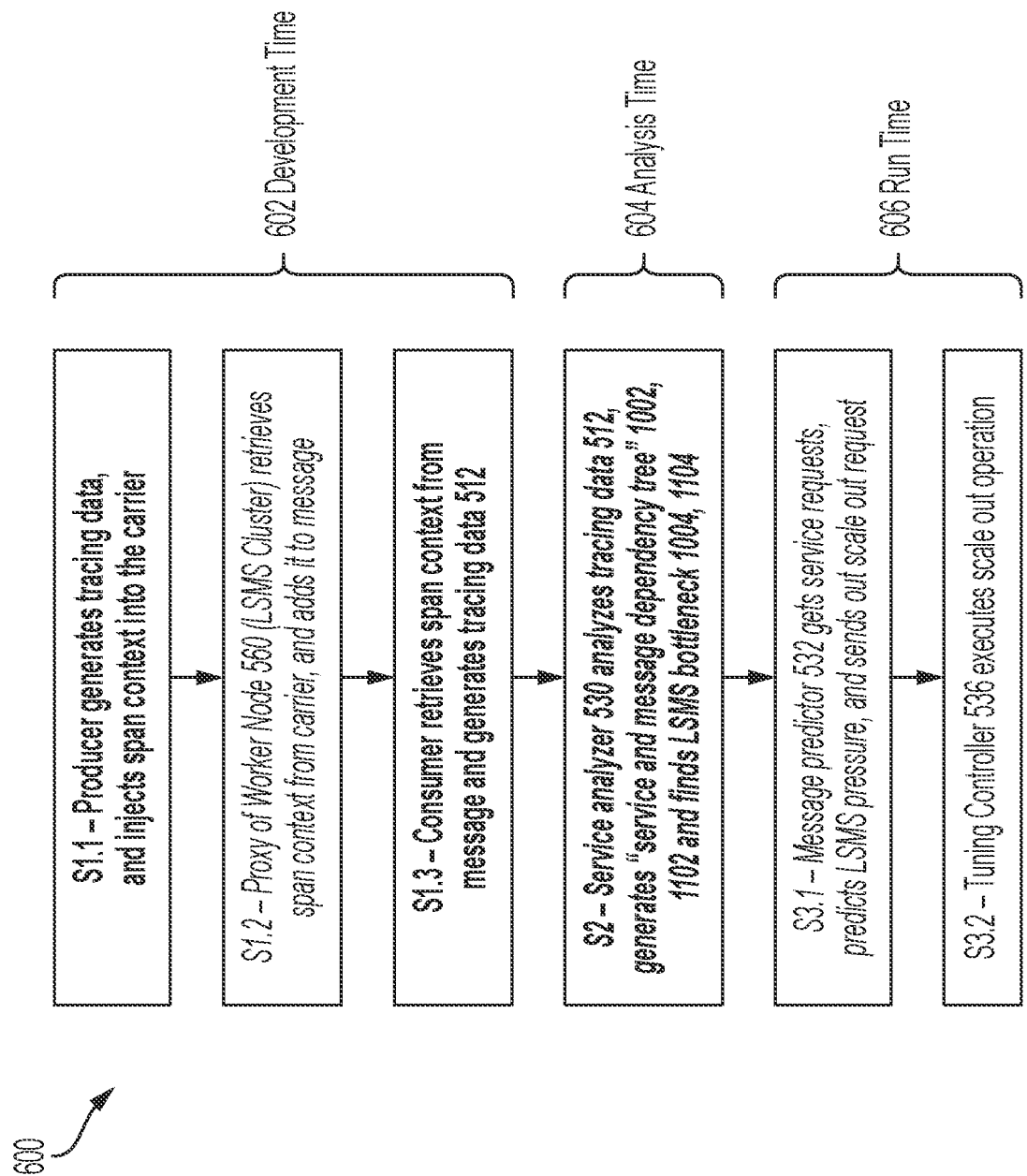
FIG. 6 depicts thea methodology embodying aspects of the invention.

FIG. 5 is depicted in two parts as FIG. 5A and FIG. 5B, wherein in FIG. 5 depicts a diagram illustrating a system architecture 500 and a methodology (shown as S1.1-S3.2) embodying aspects of the invention. For ease of description, references herein to FIG. 5 refer to the either FIG. 5A or FIG. 5B where the relevant component or step is shown. As noted, FIG. 5 depicts a diagram illustrating the system architecture 500 and the methodology (shown as S1.1-S3.2) embodying aspects of the invention; and FIG. 6 depicts a methodology 600 that shows the operations S1.1-S3.2 shown in FIG. 5. As shown in FIG. 5, the system architecture 500 is configured as an OS-COF having a tracing server 510, a master node 520, a worker node 540, and a worker node 560, configured and arranged as shown. As shown, the tracing server 510 coordinates the performance of the tracing operations and stores tracing data 512. The master node 520 includes a scheduler 522, a controller manager 524, an API server 526, and a metadata store 528, configured and arranged as shown. In accordance with embodiments of the invention, the master node 520 further includes a service analyzer 530, a message predictor 532, and a tuning controller 534, configured and arranged a shown. The worker node 540 includes an ingress gateway 542, along with a series of pods where each pod corresponds to one of the services (Service A-Service F). Each pod (e.g., Service A Pod) of the worker node 540 includes a proxy (i.e., a server) and a container. The worker node 560 is implemented as an LSMS cluster. The worker node 560 further includes a Zookeeper service 562, along with a series of pods where each pod is implemented as an LSMS broker (LSMS Broker 1 pod, LSMS Broker 2 pod, and LSMS Broker 3 pod). Each pod (e.g., Service A Pod) of the worker node 560 includes a proxy (i.e., a server) and a container (i.e., LSMS Broker 1 container), and each container includes topics (e.g., Topic 1 and Topic 2) and partitions (e.g., Partition 1 and Partition 3). Accordingly, the system architecture 500 can be used to perform several services in a cloud environment, and these services can be deployed as microservices (e.g., Service A through Service F). In order to invoke one another, a given microservice does not invoke other microservices directly. If Service A wants to invoke Service B, Service A sends a message to the worker node 560 (i.e., the LSMS cluster), and later Service B receives the message from the worker node 560 (i.e., the LSMS cluster) and starts to use the message in Service B's downstream logic. A more complete description of system architecture 500 and operations S1.1-S3.2 are provided subsequently in connection with the description of FIGS. 7-14.

In FIG. 6, the methodology 600 depicts operations S1.1-S3.2 alone and organized around development time 602, analysis time 604, and run time 606. Under development time 602, the system architecture 500 generates tracing data 512 by performing operations S1.1, S1.2, and S1.3. In S1.1, a producer application generates tracing data 512 and injects span context into the carrier of the message. In S1.2, a proxy of the worker node 560 (LSMS cluster) retrieves span context from the carrier and adds it to message, for example by inserting the span context into the HTTP header. In S1.3, a consumer retrieves span context from the message and generates tracing data 512. Under analysis time 604, S2 uses the service analyzer 530 to analyze tracing data 512, generate the "service and message dependency tree" 1002, 1102, and finds where the LSMS bottleneck 1002, 1102 of the worker node 560 (LSMS cluster) will be. Under run time 606, in S3.1 the message predictor 532 receives service requests, predicts the yet-to-occur LSMS bottleneck 1002, 1102 (shown in FIGS. 10 and 11), and sends a scale out request to the tuning controller 534. In S3.2, the tunning controller 534 executes scale out operations in response to the scale out request generated at S3.1. A more complete description of system architecture 500 and operations S1.1-S3.2 of the methodology 600 are provided in the following description of FIGS. 7-14.

Figure 7:
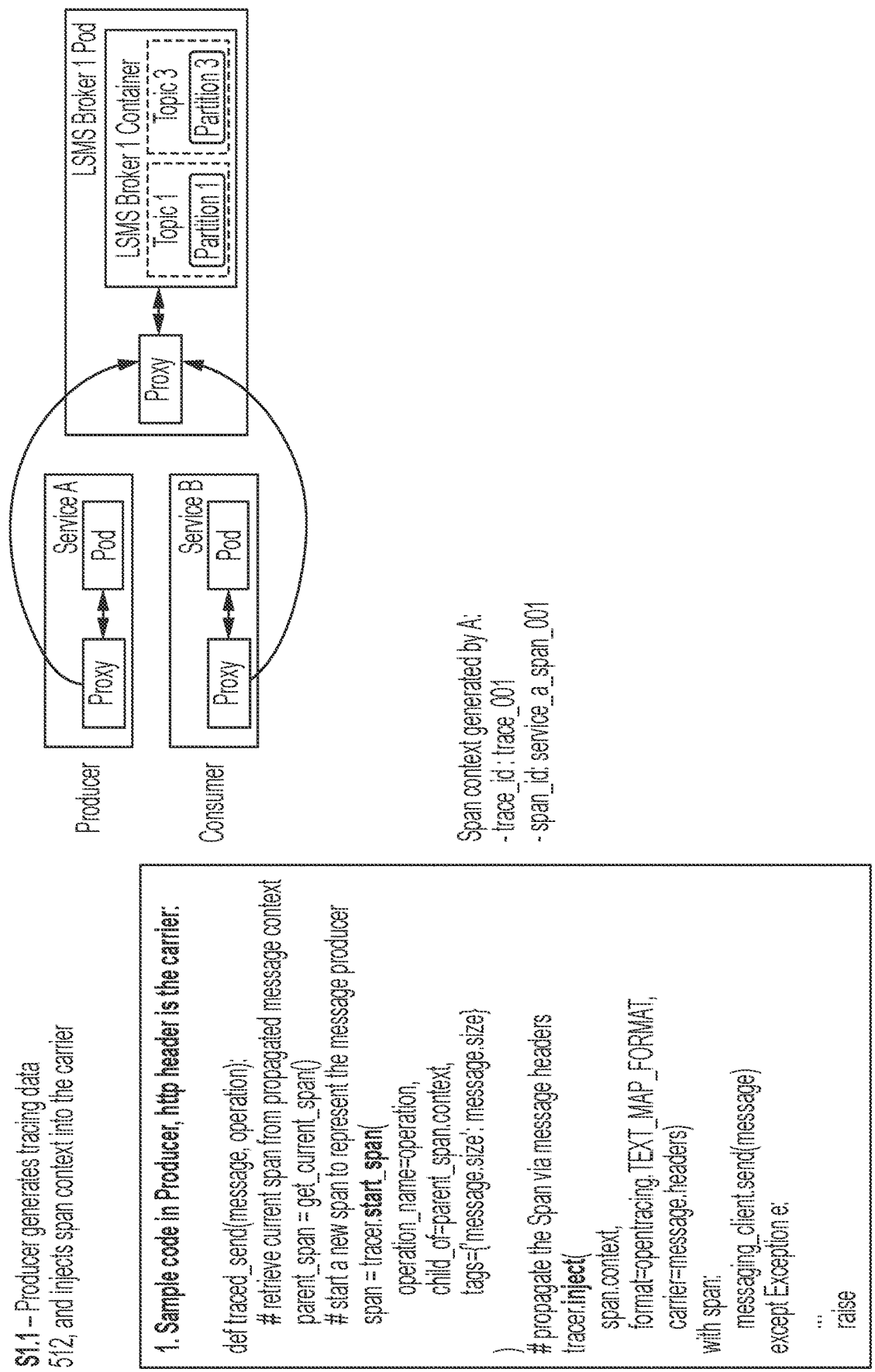
FIG. 7 depicts additional details of a portion of the methodology and system architecture shown in FIGS. 5 and 6.

FIGS. 7-14 depict how the system architecture 500 (shown in FIG. 5) and the methodology 600 (shown in FIGS. 5 and 6) operate. FIG. 7 depicts additional details of a how S1.1 of the methodology 600 is implemented by a portion of the system architecture 500. As shown in FIG. 7, the producer application generates a message and sends the message to the LSMS Broker 1 Pod. Subsequently, the consumer application retrieves the message from the LSMS Broker 1 Pod. An example of sample code that can be used in the producer application to send a message to the LSMS Broker 1 Pod and add the span context generated by Service A into the HTTP header of the message is depicted in FIG. 7. The HTTP header functions as the carrier in this scenario. As shown by the code to the right of the sample code, the span context generated by Service A includes the trace ID and the span ID, which belong to the API (i.e., A1) of Service A.

FIG. 8 depicts additional details of a how S1.2 of the methodology 600 is implemented by a portion of the system architecture 500. As shown in FIG. 8, in S1.2, when the proxy of the LSMS Broker 1 Pod receives the message, it uses the API to extract the span context from the HTTP header, which is the carrier. The proxy then adds this message header to the message, which is retrieved from the span context, which includes the trace ID; the span ID; the message size; and the topic ID. In accordance with aspects of the invention, the message size and the topic ID will be used subsequently in the methodology 600 to build the service and message dependency tree 1002, 1102 (shown in FIGS. 10 and 11). Sample code that can perform S1.2 is depicted in FIG. 8.

Figure 9:
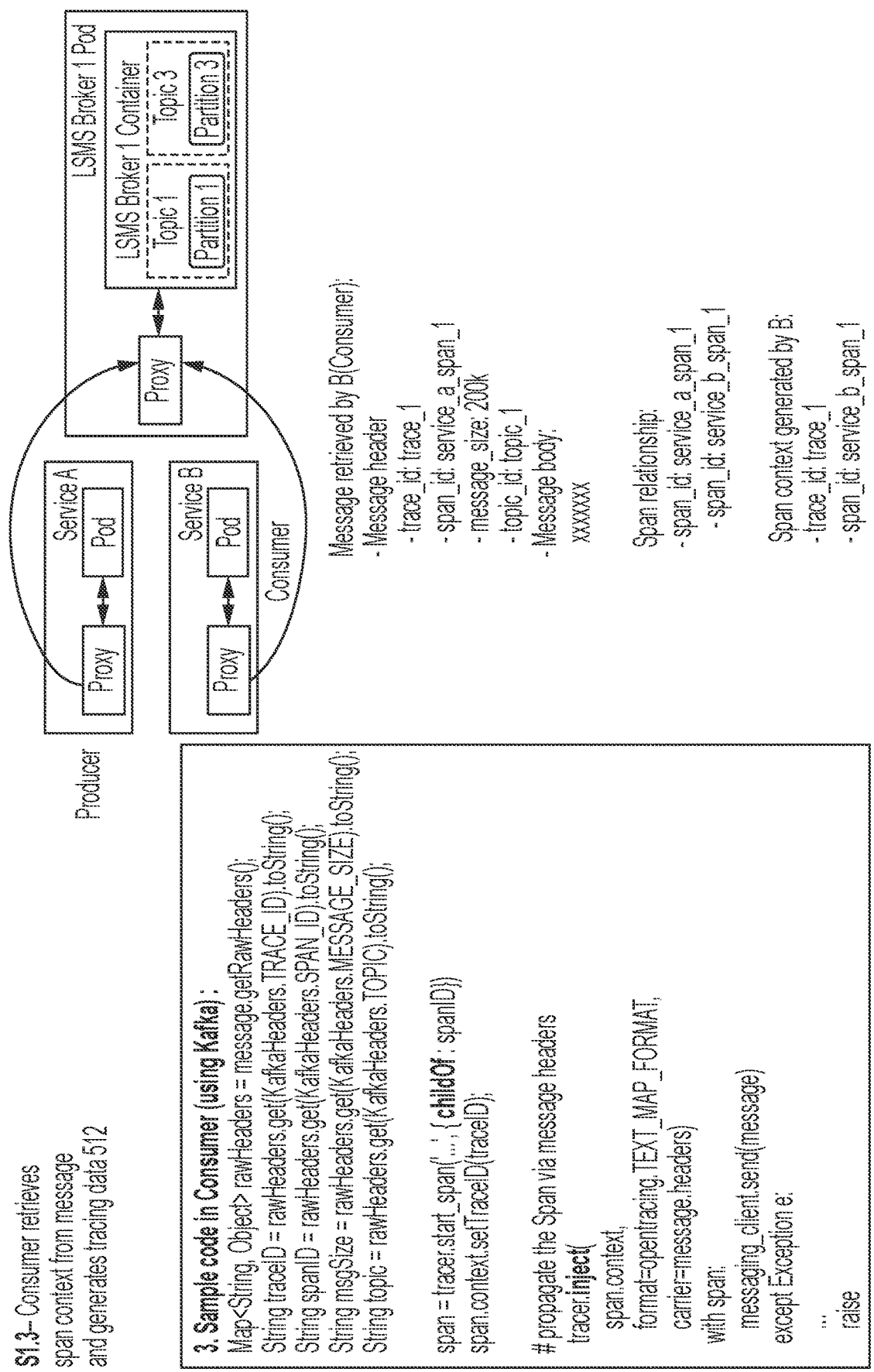
FIG. 9 depicts additional details of a portion of the methodology and system architecture shown in FIGS. 5A, 5B, and 6.

FIG. 9 depicts additional details of a how S1.3 of the methodology 600 is implemented by a portion of the system architecture 500. As shown in FIG. 9, in S1.3, the consumer application can retrieve the span context (i.e., the message header with the trace ID; the span ID; the message size; and the topic ID) and use it to generate tracing data (or "build a span relationship"). Sample code that can perform S1.3 is depicted in FIG. 9.

Figure 10:
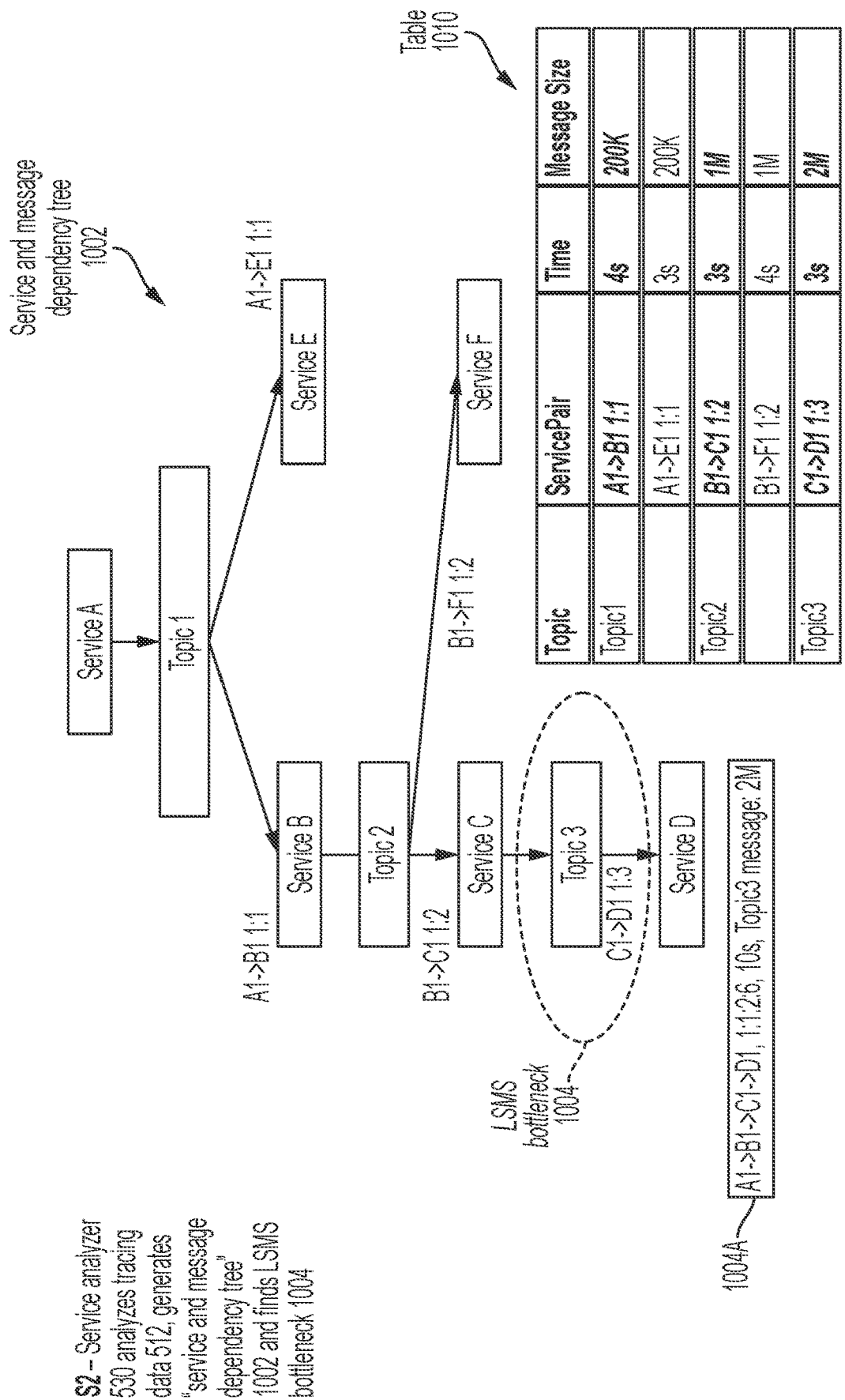
FIG. 10 depicts additional details of how a portion of the methodology shown in FIGS. 5A, 5B, and 6 can be implemented using a novel service and message dependency tree to find a yet-to-occur LSMS bottleneck in accordance with aspects of the invention.

FIG. 10 depicts additional details of a how S2 of the methodology 600 is implemented by a portion of the system architecture 500 (the service analyzer 530) using a novel service and message dependency tree 1002 into which topics are introduced in accordance with aspects of the invention. In S2 (analysis time 604 shown in FIG. 6), because the producer application and the consumer application have already generated tracing data 512, the service and message dependency tree 1002 can now be evaluated. As shown in FIG. 10, in S2, the service analyzer 530 analyzes tracing data; generates the service and message tree 1002 and the table 1010; and uses the tree 1002, calculations 1004A, and the table 1010 to locate the yet-to-occur LSMS bottleneck 1004. The tree 1002 uses the service proportions (1:1, 1:2, etc.) shown in the topmost example of the service call chains 420 shown in FIG. 4. In accordance with aspects of the invention, incorporating Topic 1, Topic 2, and Topic 3 into the tree 1002 enables the analysis time 604 performed at S2 to include the message size and the topic ID in tracing data, which allows the methodology 600 at S2 to not only obtain the proportion between APIs and the time span, but also find the yet-to-occur LSMS bottleneck 1004 at Topic 3. As shown, in the tree 1002, one instance of Service A sends a message to Topic 1, and one instance of Service B and one instance of Service E each retrieves the message from Topic 1. One instance of Service B sends a message to Topic 2, and two instance of Service C and two instances of Service F retrieve the message from Topic 2. Two instances of Service C send messages to Topic 3, and three instances (six total instances) of Service D each retrieves the messages from Topic 3 (six total messages).

Table 1010 show results of the calculations 1004A performed at S2 to identify the yet-to-occur LSMS bottleneck 1004, wherein the table 1010 is organized around the topics—Topic 1, Topic 2, and Topic 3. As shown by calculations 1004A and the table 1010, the bottleneck occurs along the tree path that moves from A1 to D1, which takes 10 seconds (4 s at Topic 1, 3 s at Topic 2, and 3 s at Topic 3) and has the largest message size (2M) at Topic 3.

Figure 11:
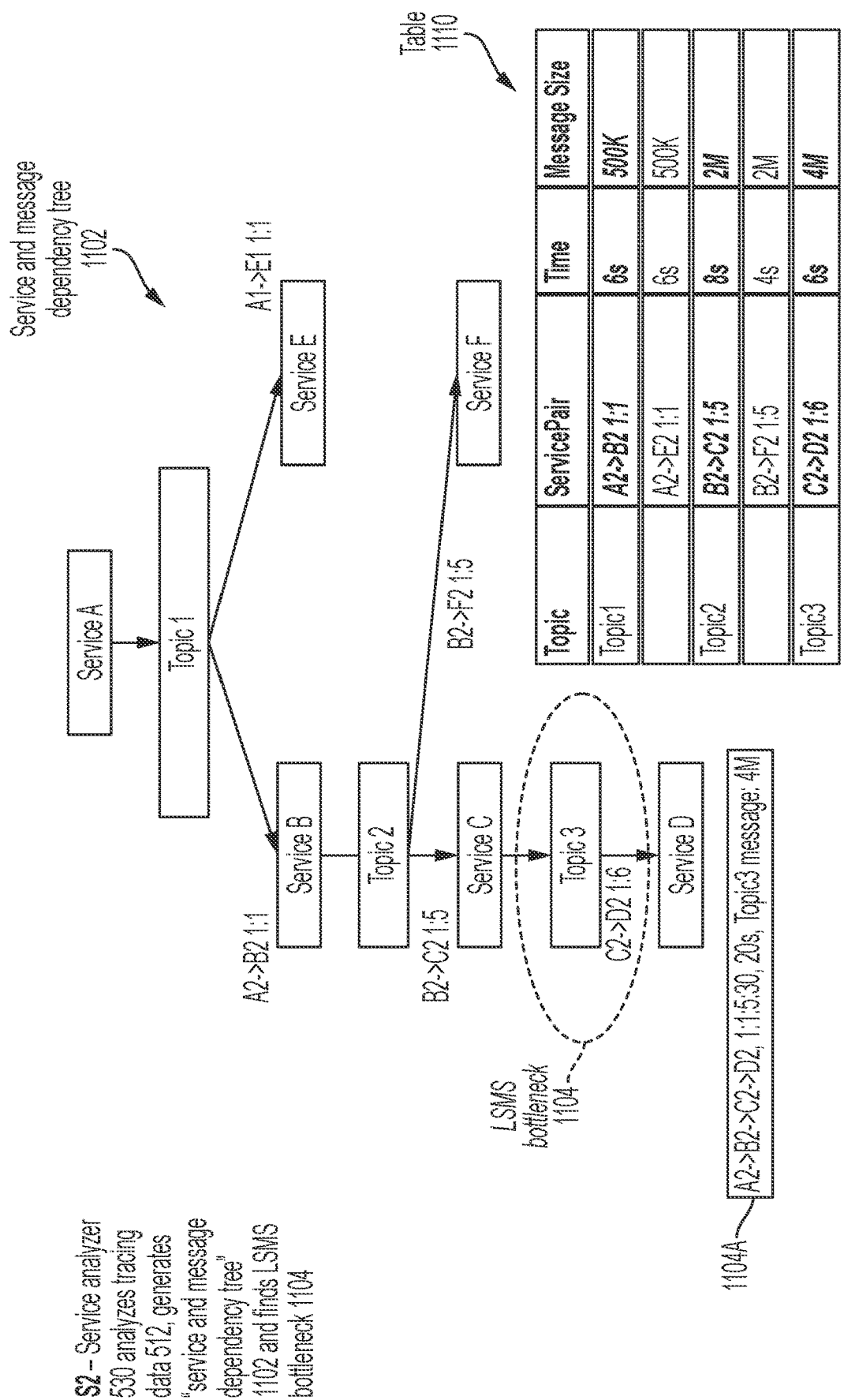
FIG. 11 depicts additional details of how a portion of the methodology shown in FIGS. 5A, 5B, and 6 can be implemented using a novel service and message dependency tree to find a yet-to-occur LSMS bottleneck in accordance with aspects of the invention.

FIG. 11 depicts additional details of a how S2 of the methodology 600 is implemented by a portion of the system architecture 500 (the service analyzer 530) using a novel service and message dependency tree 1102 into which topics are introduced in accordance with aspects of the invention. In S2 (analysis time 604 shown in FIG. 6), because the producer application and the consumer application have already generated tracing data 512, the service and message dependency tree 1102 can now be evaluated. As shown in FIG. 10, in S2, the service analyzer 530 analyzes tracing data; generates the service and message tree 1102 and the table 1110; and uses the tree 1102, calculations 1104A, and the table 1110 to locate the yet-to-occur LSMS bottleneck 1104. The tree 1102 uses the service proportions (1:1, 1:2, etc.) shown in the bottommost example of the service call chains 420 shown in FIG. 4. In accordance with aspects of the invention, incorporating Topic 1, Topic 2, and Topic 3 into the tree 1102 enables the analysis time 604 performed at S2 to include the message size and the topic ID in tracing data, which allows the methodology 600 at S2 to not only obtain the proportion between APIs and the time span, but also find the yet-to-occur LSMS bottleneck 1104 at Topic 3. As shown, in the tree 1102, one instance of Service A sends a message to Topic 1, and one instance of Service B and one instance of Service E each retrieves the message from Topic 1. One instance of Service B sends a message to Topic 2, and five instance of Service C and five instances of Service F retrieve the message from Topic 2. Five instances of Service C send messages to Topic 3, and six instances (thirty total instances) of Service D each retrieves the messages from Topic 3 (thirty total messages).

Table 1110 show results of the calculations 1104A performed at S2 to identify the yet-to-occur LSMS bottleneck 1104, wherein the table 1110 is organized around the topics—Topic 1, Topic 2, and Topic 3. As shown by calculations 1104A and the table 1110, the bottleneck occurs along the tree path that moves A1 to D1, which takes 20 seconds (6 s at Topic 1, 8 s at Topic 2, and 6 s at Topic 3) and has the largest message size (4M) at Topic 3.

Figure 12:
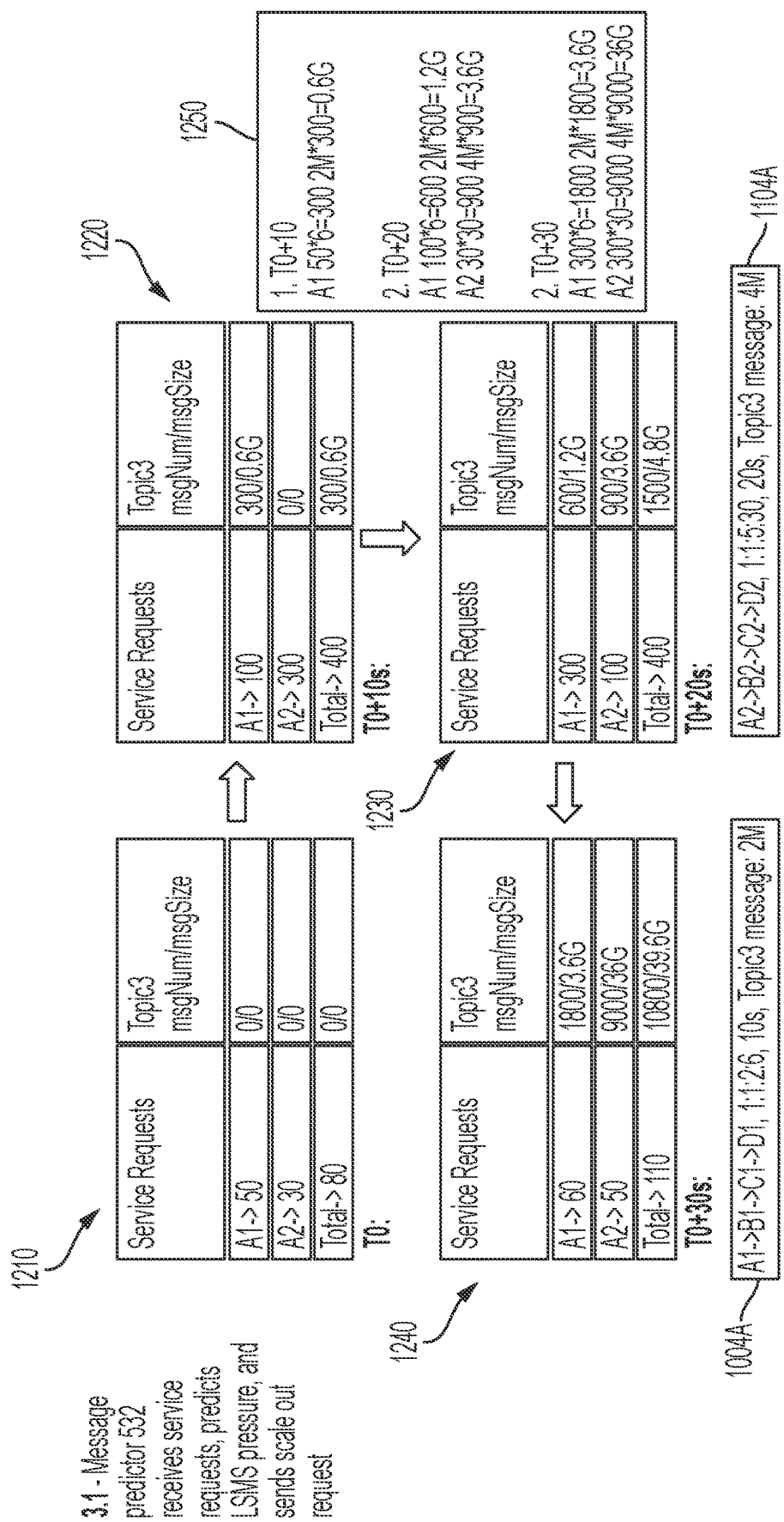
FIG. 12 depicts additional details of how a portion of the methodology shown in FIGS. 5 and 6 can be implemented by using details of the yet-to-occur LSMS bottleneck depicted in FIGS. 10 and 11 to perform calculations that predict the yet-to-occur LSMS bottleneck for received messages in accordance with aspects of the invention.

FIG. 12 depicts additional details of a how S3.1 of the methodology 600 is implemented by a portion of the system architecture 500 (the message predictor 532) to receive actual service requests, predict LSMS pressure, and send a scale out request that will alleviate the LSMS pressure before it actually occurs. Operations 1210, 1220, 1230, 124 depict how S3.1 can be applied to both the topmost and bottommost examples of the service call chains 420 shown in FIG. 4. Calculations 1250 illustrate the supporting calculations used at the operations 1210, 1220, 1230, 1240 to determine the LSMS pressure, which corresponds to the LSMS bottlenecks 1004, 1104 (shown in FIGS. 10 and 11). Beginning at operations 1210, at T0 (time zero), 50 service requests are received at A1 (a first API for Service A), and the Topic 3 message number/size for A1 is 0/0. Also, 30 service requests are received at A2 (a second API for Service A), and the Topic 3 message number/size for A2 is 0/0. At operations 1220, at time T0+10 s (10 seconds have passed since T0), as determined by the service and message dependency tree 1002 (shown in FIG. 10), the Topic 3 message number/size for the 50 service requests received at A1 at T0 will be 300/0.6G. Calculations 1250 depict how the Topic 3 message number/size for A1 at operation 1220 are determined. For the 30 service requests received at A2 in operation 1210, only 10 seconds have passed so the bottleneck for the 30 service request received at A2 in operation 1210 have not completed. Two additional things happen at operations 1220—100 additional service requests are received at A1, and 300 service requests are received at A2. At operations 1230, at time T0+20 s (20 seconds have passed since T0), as determined by the service and message dependency trees 1002 1102 (shown in FIGS. 10 and 11), the Topic 3 message number/size for the 100 service requests received at A1 at T0+10 will be 600/1.2G; and the Topic 3 message number/size for the 30 service requests received at A2 at T0 will be 900/3.6G. Calculations 1250 depict how the Topic 3 message number/size for A1 and A2 at operation 1230 are determined. At operations 1240, at time T0+30 s (30 seconds have passed since T0), as determined by the service and message dependency trees 1002 1102 (shown in FIGS. 10 and 11), the Topic 3 message number/size for the 300 service requests received at A1 at T0+20 will be 1800/3.6G; and the Topic 3 message number/size for the 300 service requests received at A2 at T0+10 will be 9000/36G. Calculations 1250 depict how the Topic 3 message number/size for A1 and A2 at operation 1240 are determined.

FIG. 13 depicts additional details of how S3.1 using the operations 1300 generates an appropriate scale out request that will alleviate (or avoid) the predicted LSMS pressure before the predicted LSMS actually occurs. In summary, the current partition configuration is assessed; the predicted partition needs are determined; the partition configuration that would be needed in order to handle the predicted partition needs without creating a bottleneck is determined; and a scale out request to provide the predicted partition needs is sent before the predicted bottleneck occurs.

Figure 14:
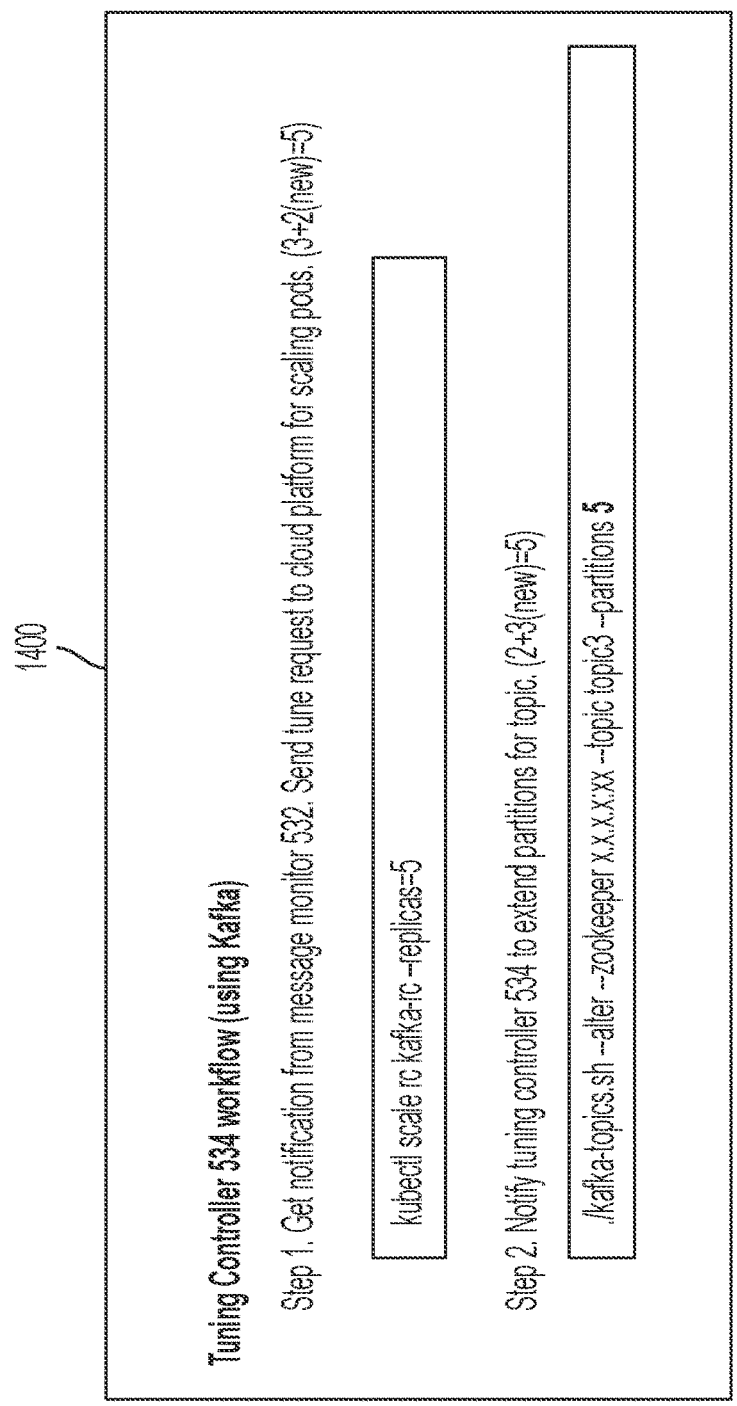
FIG. 14 depicts additional details of how a portion of the methodology shown in FIGS. 5 (shown in two parts as FIG. 5A and FIG. 5B) and 6, along with the system architectures shown in FIG. 5 (shown in two parts as FIG. 5A and FIG. 5B) can be used to execute the scale out request shown in FIG. 13 in accordance with aspects of the invention.

FIG. 14 depicts additional details of how S3.2 of the methodology 600 can be implemented by a portion of the system architecture 500 (the tuning controller 534) to receive the scale out request and execute a scale out operation that will alleviate the LSMS pressure before it actually occurs. Example Kafka code for carrying out S3.2 is depicted in FIG. 14.

Figure 15:
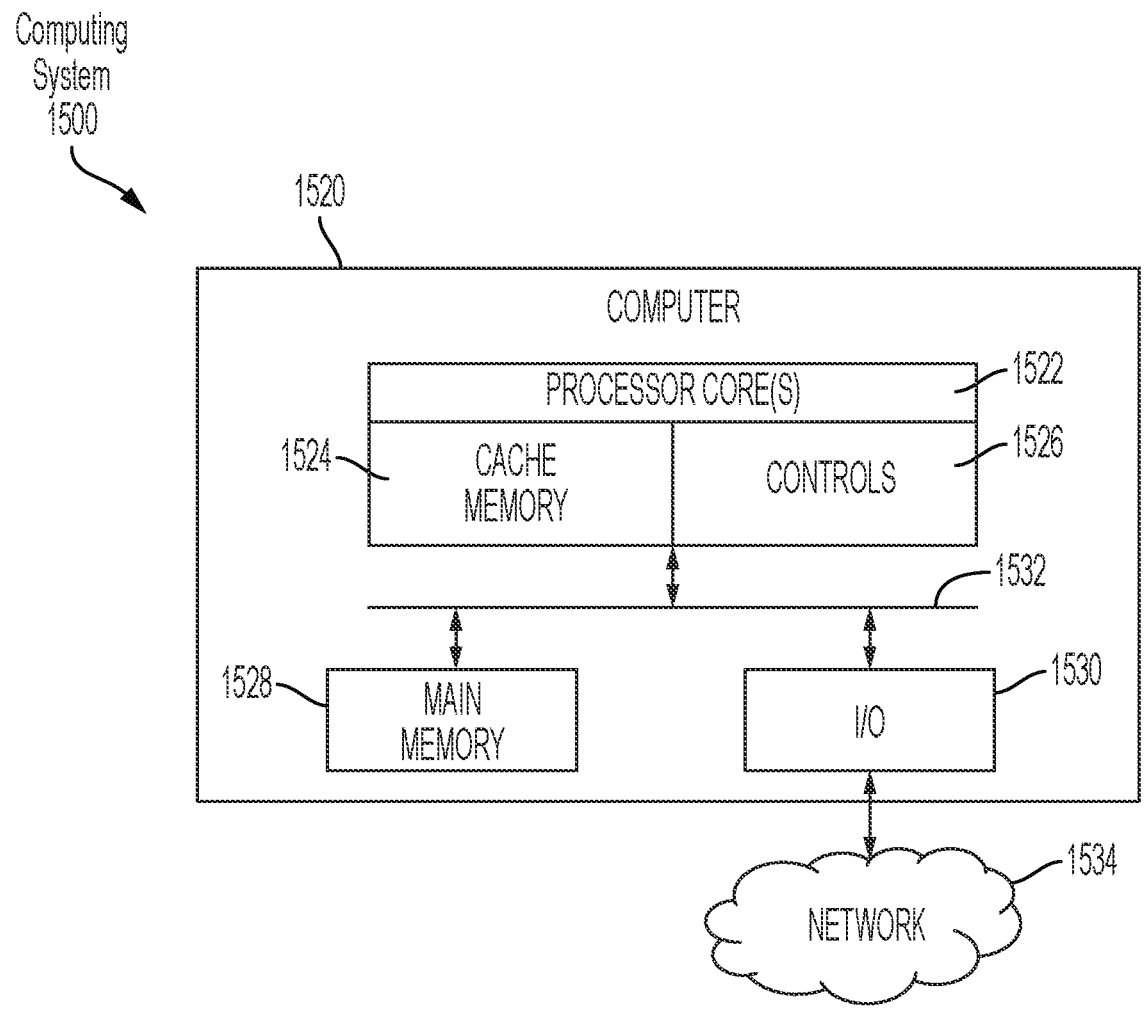
FIG. 15 depicts details of an exemplary computing system capable of implementing aspects of the invention.

FIG. 15 illustrates an example of a computer system 1500 that can be used to implement any of the computer-based components of the various embodiments of the invention described herein. The computer system 1500 includes an exemplary computing device ("computer") 1502 configured for performing various aspects of the content-based semantic monitoring operations described herein in accordance aspects of the invention. In addition to computer 1502, exemplary computer system 1500 includes network 1514, which connects computer 1502 to additional systems (not depicted) and can include one or more wide area networks (WANs) and/or local area networks (LANs) such as the Internet, intranet(s), and/or wireless communication network(s). Computer 1502 and additional system are in communication via network 1514, e.g., to communicate data between them.

Exemplary computer 1502 includes processor cores 1504, main memory ("memory") 1510, and input/output component(s) 1512, which are in communication via bus 1503. Processor cores 1504 includes cache memory ("cache") 1506 and controls 1508, which include branch prediction structures and associated search, hit, detect and update logic, which will be described in more detail below. Cache 1506 can include multiple cache levels (not depicted) that are on or off-chip from processor 1504. Memory 1510 can include various data stored therein, e.g., instructions, software, routines, etc., which, e.g., can be transferred to/from cache 1506 by controls 1508 for execution by processor 1504. Input/output component(s) 1512 can include one or more components that facilitate local and/or remote input/output operations to/from computer 1502, such as a display, keyboard, modem, network adapter, etc. (not depicted).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 16:
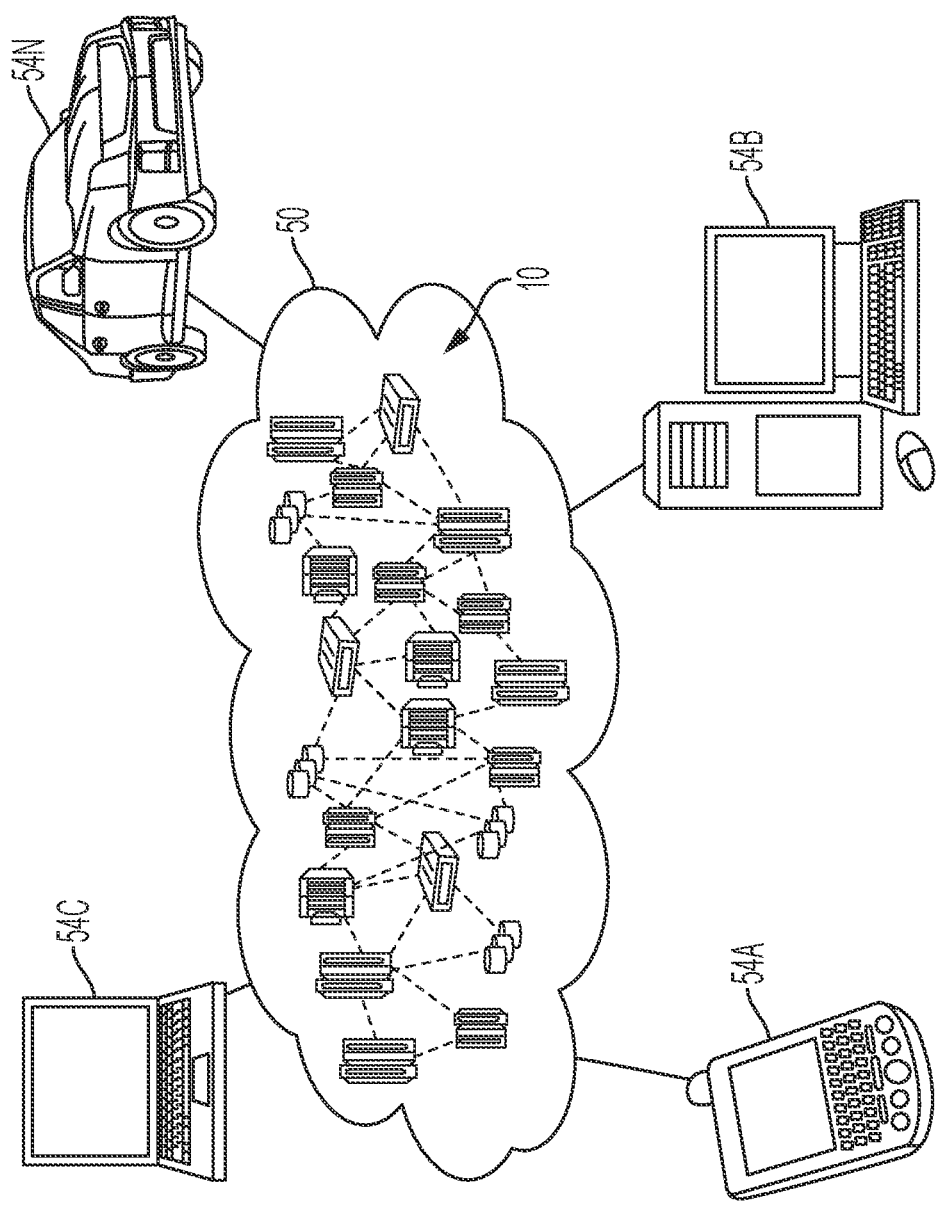
FIG. 16 depicts a cloud computing environment according to embodiments of the invention.

Referring now to FIG. 16, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
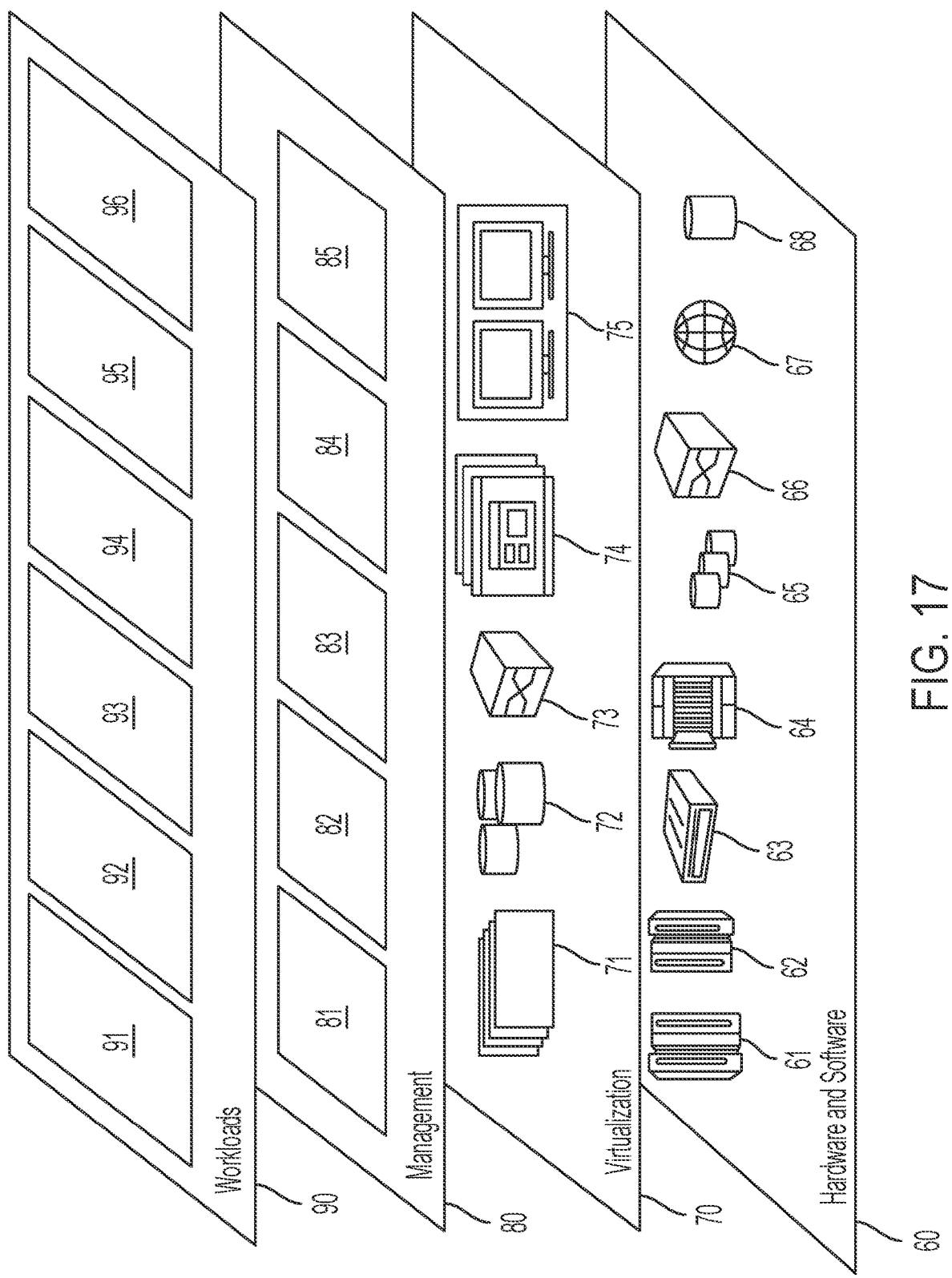
FIG. 17 depicts abstraction model layers according to an embodiment of the invention.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatically controlling resource partitions in advance of a predicted bottleneck in a log steaming message system 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, unless the context clearly indicates otherwise, the singular forms "a", "an" and "the" are intended to include the plural forms. The terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially" and equivalents thereof are intended to include the degree of error associated with measurement of the particular quantity based upon the equipment available at the time of filing the application. For example, "about," "substantially" and equivalents thereof can include a range of ±8% or 5%, or 2% of a given value.

While the present invention has been described in detail in connection with only a limited number of embodiments, it should be readily understood that the present invention is not limited to such disclosed embodiments. Rather, the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description but is only limited by the scope of the appended claims.

What is claimed is:

1. A computer-implemented method for allocating computing resources, the computer-implemented method comprising:
    generating, using a processor, tracing data that results from message traffic processed through multiple message paths by the processor;
    analyzing, using the processor, the tracing data to generate;

service relationships associated with log streaming messages that generate the message traffic; and service call chains disassembled from the service relationships and associated with the log streaming messages that generate the message traffic;

using the processor to use the service relationships, the service call chains, message size data, and topic data to generate a service and message tree operable to represent relationships between services, the topic data, and the message size data;

using the service and message tree to identify a predicted bottleneck path among the multiple message paths, wherein the predicted bottleneck path comprises at least one of the multiple message paths on which a message bottleneck is predicted to occur; and allocating computer resources to the predicted bottleneck path before the predicted message bottleneck occurs.

2. The computer-implemented method of claim 1, wherein generating the tracing data comprises injecting the topic data into the log streaming messages that generate the message traffic.

3. The computer-implemented method of claim 2, wherein generating the tracing data further comprises injecting the message size data into the log streaming messages that generate the message traffic.

4. The computer-implemented method of claim 1 further comprising generating a predicted message size and a duration of the predicted message bottleneck.

5. The computer-implemented method of claim 4 further comprising generating a scale out request based at least in part on the predicted message size and the duration of the predicted message bottleneck.

6. The computer-implemented method of claim 5 further comprising executing the scale out request to perform allocating of the computer resources to the predicted bottleneck path before the predicted message bottleneck occurs.

7. The computer-implemented method of claim 6, wherein the processor includes a log streaming message system.

8. A computer system comprising a memory communicatively coupled to a processor, wherein the processor is configured to perform processor operations comprising:

generating tracing data that results from message traffic processed through multiple message paths by the processor;

analyzing the tracing data to generate:
service relationships associated with log streaming messages that generate the message traffic; and
service call chains disassembled from the service relationships and associated with the log streaming messages that generate the message traffic;

using the service relationships, the service call chains, message size data, and topic data to generate a service and message tree operable to represent relationships between services, the topic data, and the message size data;

using the service and message tree to identify a predicted bottleneck path among the multiple message paths, wherein the predicted bottleneck path comprises at least one of the multiple message paths on which a message bottleneck is predicted to occur; and allocating computer resources to the predicted bottleneck path before the predicted message bottleneck occurs.

9. The computer system of claim 8, wherein generating the tracing data comprises injecting the topic data into the log streaming messages that generate the message traffic.

10. The computer system of claim 9, wherein generating the tracing data further comprises injecting the message size data into the log streaming messages that generate the message traffic.

11. The computer system of claim 8, wherein the processor operations further comprise generating a predicted message size and a duration of the predicted message bottleneck.

12. The computer system of claim 11, wherein the processor operations further comprise generating a scale out request based at least in part on the predicted message size and the duration of the predicted message bottleneck.

13. The computer system of claim 12, wherein the processor operations further comprise executing the scale out request to perform allocating of the computer resources to the predicted bottleneck path before the predicted message bottleneck occurs.

14. The computer system of claim 13, wherein the processor includes a log streaming message system.

15. A computer program product for allocating computer resources, the computer program product comprising a computer readable program stored on a computer readable storage medium, wherein the computer readable program, when executed on a processor, causes the processor to perform a method comprising:

generating tracing data that results from message traffic processed through multiple message paths by the processor;

analyzing the tracing data to generate:
service relationships associated with log streaming messages that generate the message traffic; and
service call chains disassembled from the service relationships and associated with the log streaming messages that generate the message traffic;

using the service relationships, the service call chains, message size data, and topic data to generate a service and message tree operable to represent relationships between services, the topic data, and the message size data;

using the service and message tree to identify a predicted bottleneck path among the multiple message paths, wherein the predicted bottleneck path comprises at least one of the multiple message paths on which a message bottleneck is predicted to occur; and allocating computer resources to the predicted message bottleneck path before the predicted message bottleneck occurs.

16. The computer program product of claim 15, wherein generating the tracing data comprises injecting the topic data into log streaming messages that generate the message traffic.

17. The computer program product of claim 16, wherein generating the tracing data further comprises injecting the message size data into the log streaming messages that generate the message traffic.

18. The computer program product of claim 15, wherein the method further comprises generating a predicted message size and a duration of the predicted message bottleneck.

19. The computer program product of claim 18, wherein the method further comprises:

generating a scale out request based at least in part on the predicted message size and the duration of the predicted message bottleneck; and executing the scale out request to perform allocating of the computer resources to the predicted bottleneck path before the predicted message bottleneck occurs.

20. The computer program product of claim 19, wherein the processor includes a log streaming message system.

* * * * *